March 5, 1957 F. HENZ 2,783,752

CONTROL DEVICE

Filed Nov. 17, 1954

INVENTOR.
FRANK HENZ
BY Paul Mooroo Dugger
ATTORNEYS

United States Patent Office 2,783,752
Patented Mar. 5, 1957

2,783,752

CONTROL DEVICE

Frank Henz, Minneapolis, Minn.

Application November 17, 1954, Serial No. 469,380

10 Claims. (Cl. 123—102)

This invention relates to a control device for internal combustion automotive engines. More particularly this invention relates to a device for controlling automotive engines while running at low R. P. M. to prevent lugging or over-exertion of the engine. Although not so limited, the device of this invention is especially adapted to use for heavy duty automotive engines such as trucks and the like.

The principal object of this invention is to provide a device for preventing lugging of automotive engines operating at low R. P. M. by forcing the operator to shift to a lower gear to increase the R. P. M. For example, a truck operator hauling a heavy load up a grade with the engine in a higher gear than required by the existing conditions over-exerts the engine, putting a severe strain upon it, greatly increasing the wear and shortening its effective life. To relieve this condition requires only that the driver shift to a lower gear, thereby increasing the R. P. M. of the motor. However, rather than shift, the operator in many instances throttles the engine instead. The device of this invention removes the operator's description by upsetting the equilibrium of the engine momentarily stalling his engine and forcing him to shift to a lower gear.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative however, of but a few of the various ways in which the principles of the invention may be employed.

The invention is illustrated by the drawings wherein the same numerals are used to designate corresponding parts and in which.

Broadly stated, this invention comprises a low R. P. M. control device whose operation is based upon the maintenance of a predetermined engine vacuum and which momentarily induces a stall in the engine upon a reduction or failure of engine vacuum by acting upon the fuel system or the electrical system of the engine. The reduction of engine vacuum causes electrical contact to be made between two contacts normally held apart and, depending upon the system to which the control is connected, actuates a relay to reduce the current to the ignition coil or actuates a solenoid air valve to cause air under pressure to flow to the diaphragm of the carburetor governor which in turn closes the throttle. In either instance the engine goes into a momentary stall and will stop if the operator does not shift to a lower gear to increase the R. P. M. and permit the engine vacuum to build up and break the contact. The air pressure system is the preferred form for use on heavy duty vehicles.

Figure 1:
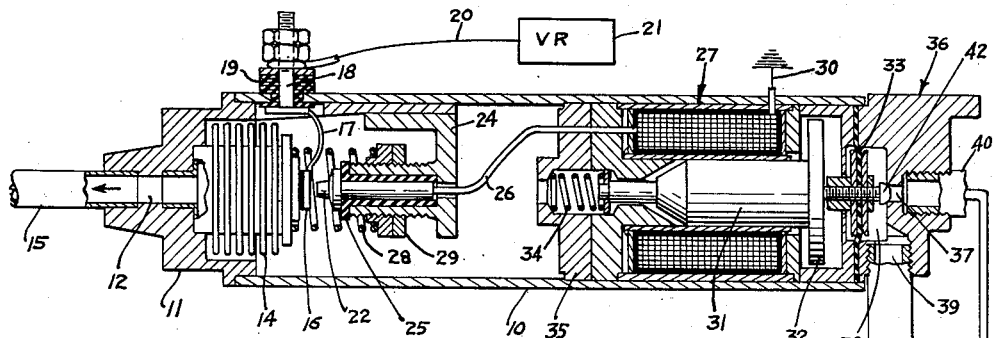
Figure 1 is a vertical section through one form of the invention also showing diagrammatically the functioning of the device operating in the fuel system to prevent lugging.

Referring now to the drawings and particularly to Figure 1, there is here illustrated one form of the invention. The device comprises generally a tubular housing 10, one end of which is closed by a fitting 11 having a central aperture 12 and containing a bellows 14 on its inner side. Bellows 14 is closed at its inside and communicates at the other end with aperture 12 which serves as a vacuum chamber. At the opposite end of aperture 12 is a connection 15 to the intake manifold of the engine. The closed end of bellows 14 is provided with an electrical contact point 16 insulated from the metal of the bellows. This contact point 16 is connected by wire 17 to a terminal 18 in the wall of housing 10. Terminal 18 is held by an insulating fitting 19 out of contact with the housing wall. A wire 20 connects terminal 18 to the voltage regulator 21. A companion contact point 22 is held fixed in a bracket 24 on the inside wall of housing 10. Point 22 is held insulated from the bracket by an insulating fitting 25 and is connected by a wire 26 to one end of a conventional solenoid coil 27 also enclosed in housing 10. A coil spring 28 between bellows 14 and bracket 24 assists in holding contact points 16 and 22 apart. The tension of spring 28 may be adjusted by threaded collar 29. The tension of spring 28 alone is never sufficient, however, to maintain points 16 and 22 apart.

The opposite end of solenoid coil 27 is grounded as shown diagrammatically at 30. Normally housing 10 will be grounded by being fastened to the frame of the vehicle. The plunger 31 of the solenoid is provided with an annular plate 32 and is normally urged against a flexible diaphragm 33 by a coil spring 34 seated in a depression in an end plate 35 positioned in housing 10 intermediate of its ends. Diaphragm 33 is held in a two-piece fitting 36 forming an air valve and the opposite end of housing 10. End fitting 36 has a central aperture 37 to a valve chamber 38 and another aperture 39 from that chamber. Aperture 37 is provided with a connection 40 to the vehicle's air compressor and aperture 39 is provided with a connection to the carburetor governor diaphragm. A valve member 42 is affixed in the center of flexible diaphragm 33 adapted to seat in the inner end of aperture 37 in valve chamber 38 when so urged by spring loaded plunger 31.

In the operation of this form of the device of the invention points 16 and 22 will be held out of contact during the normal operation of the automotive engine. Contact point 16 will be held away from point 22 by the vacuum of the engine drawing on bellows 14 from the intake manifold through connection 14 and aperture 12. Bellows 14 is assisted by coil spring 28 in holding the points apart. When the engine is lugging, as when the vehicle is overworking, the engine vacuum drops. To maintain the vacuum the operator should shift into a lower gear in order to increase the engine R. P. M. However, many drivers, to the detriment of their equipment, tend to throttle the engine instead of shifting. When the engine vacuum drops some predetermined amount as indicated by the tension of spring 28 the actuator takes over and removes the driver's discretion as to shifting by forcing him to shift or stall. When the vacuum drops the contacts close. Wire 20 is connected to the voltage regulator on the generator side so as to carry current only when the engine is running and the generator is charging. (Otherwise it would not be possible to start the engine.) When the contacts close current flows from the voltage regulator 21 through wire 20 to terminal 18, through wire 17 to point 16, to point 22 and through wire 26 energizing solenoid 26 which is grounded at 30. When the solenoid is energized plunger 31 trys to assume an equilibrium position in the coil and in so doing retracts plate 32 from the diaphragm 33 and valve element 42 from the mouth of aperture 37.

Retraction of the valve element permits air from the vehicle's air compressor to flow through connection 40 and aperture 37 into chamber 38 and out through aperture 39 and connection 41 to the carburetor governor diaphragm 44. Diaphragm 45 is normally at equilibrium. Introducing the compressed air to the diaphragm chamber upsets this equilibrium lifting connecting rod 46 and spring tensioned crank arm 47 of the carburetor 48 which shuts off the throttle and the fuel supply to the engine. Crank arm 47 acts independently of crank arm 49 which is connected to the operator's foot throttle. Thus, even though the driver has the foot throttle on the floor boards the fuel supply is cut off. The shutting off of the fuel to the engine causes a momentary stall which is immediately corrected if the driver shifts to a lower gear. This causes the engine R. P. M. to increase, building up the engine vacuum and breaking contact between points 16 and 22. This de-energizes the solenoid causing spring 34 to push plunger 31 and plate 32 against diaphragm 33 closing valve 36 and cutting off the air supply to the carburetor governor.

Figure 2:
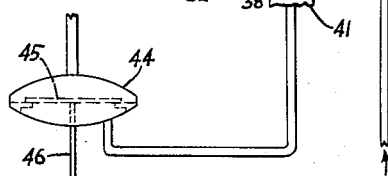
Figure 2 is a sectional and diagrammatic representation of another form of the invention shown operating on the ignition system of the engine.
Figure 2:
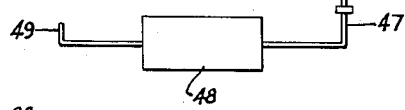

In Figure 2 there is shown an alternative form of the invention. In this modification the control acts upon the electrical system of the automotive vehicle and is especially adapted to use with smaller, lighter duty vehicles. In this form of the invention the actuator is enclosed in a fitting 50 adapted to be held in a bracket or housing 51 affixed to the frame of the vehicle. The actuator includes an enlarged central aperture into which is fitted a bellows 52 similar in construction to bellows 14. Bellows 52 communicates through central aperture 54 to a connection to the intake manifold. The closed end of the bellows has a contact point 55 in direct electrical contact with the bellows and through it to the frame. Another contact point 56 is held in an insulating fitting 57 in position to contact point 55. Point 56 terminates in a terminal 58 from which it is connected by a wire 59 to a relay indicated generally at 60. In normal position when the engine is not in operation the contact points will touch. As shown in this figure the bellows is retracted under the influence of the engine vacuum, its normal position when the engine is in operation.

Relay 60 includes a winding 61 around a core 62, two contact points 64 and 65 and an armature 66 pivoted at 67. In normal operating position armature 66 is tensioned by coil spring 68 to touch contact 64, current from voltage regulator 69 flows through wire 70 to the armature 66, to point 64 and through wire 71 to the ignition coil. Here too, the connection is to the generator side of the voltage regulator so current flows only when the engine is running and the generator is charging. When the engine is overworked and the vacuum drops, bellows 52 expands completing contact between points 55 and 56. This grounds coil 61 setting up magnetic induction in core 62 as current from the voltage regulator flows through wire 72 to coil 61, through wire 59 to terminal 58, through contact points 56 and 55 through the bellows 52 to fitting 50 in bracket 51 grounded by attachment to the frame of the vehicle, as indicated at 74. When coil 61 is energized armature 66 is attracted to core 62 pivoting at 67 and making contact with point 65. The current from the battery and voltage regulator then passes through wire 70 to the armature 66 to point 65 and through line 75 to the ignition coil. However, since line 75 includes a resistor 76 the voltage to the ignition coil is greatly diminished, being inadequate to sustain ignition in the engine and causing a momentary stall. This forces the driver to shift to a lower gear. The R. P. M. then increases and engine vacuum is restored. The increased vacuum retracts bellows 52 breaking contact between points 55 and 56. Coil 61 is de-energized and coil spring 68 returns armature 66 to its original normal position restoring full voltage to the ignition coil for normal engine operation.

Figure 3:
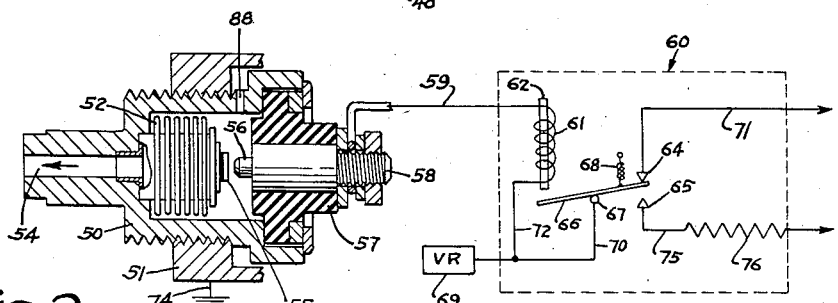
Figure 3 is a vertical section through an alternative form of actuating element.

Figure 3 shows an alternative form of actuator. A modified fitting 77 is held by bracket or housing 51A which is attached to the vehicle frame and thus grounded. Ftting 77 is provided with a central aperture 78 into which a tubular piston 79 slides with a close fit. Pressed on the end of fitting is a cap 80 having a threaded central aperture 81 communicating with aperture 78. A threaded nipple member 82 is positioned in aperture 81 locked by nut 84. Nipple member 82 is likewise provided with a central aperture 85 in communication with aperture 78 and for connection with the intake manifold. A coil spring 86 fits inside of tubular piston 79 and rests on the end of nipple member 82. The end of piston 79 forms a contact point 87. Spring 86 tends normally to force contact point 87 against contact 56A when the engine is not operating. Contact point 56A is held in an insulating fitting 57A out of contact with fitting 77. Point 56A ends in a terminal post 58A to which a wire 59A may be attached for connection to a relay, such as shown at 60 in Figure 2. When the engine is in normal operation the engine vacuum drawing through apertures 85 and 78 acts to withdraw piston 79 and contact point 87 from contact with point 56A against the action of spring 86. In the event of lugging the vacuum drops and coil spring 86 forces piston 79 against contact point 56A actuating the relay to momentarily stall the engine and force the driver to shift to a lower gear in the manner heretofore described with respect to Figure 2. The tension on spring 86, and accordingly the sensitivity of the actuator to changes in engine vacuum, is regulated by adjustment of threaded nipple member 82.

Although both the actuators of Figures 2 and 3 are shown for use with a control for the electrical system of an engine, they are easily adapted for use with air control devices affecting the fuel system by providing bellows 52 and piston 79 with insulated contact points having an outside electrical connection. Small openings 88 and 88A are provided for bringing in an insulated lead-in wire for this purpose. Alternatively, the grounds 30 and 30A of the solenoids may be connected with terminals 58 and 58A of the actuators and then lead-in wires 26 and 26A will be connected to the voltage regulator.

Figure 4:
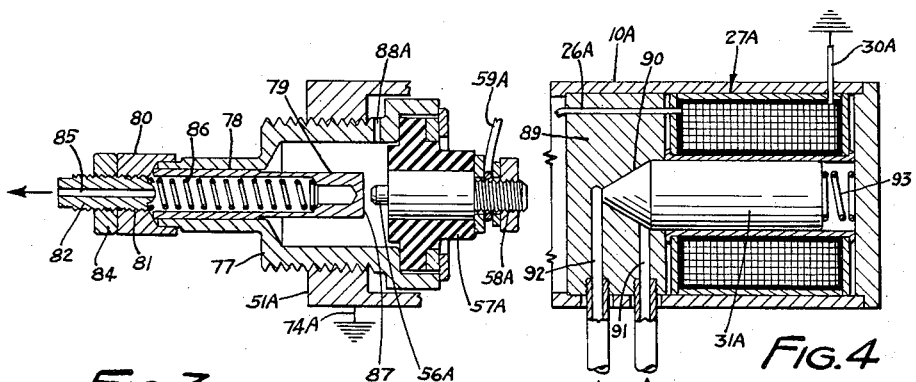
Figure 4 is an alternative form of solenoid air valve.

There is shown in Figure 4 an alternative form of air control device. The device comprises a solenoid 27A encased in a housing 10A. Positioned within housing 10A is a transverse wall member which acts as an air valve 89. Valve 89 comprises a chamber 90 having an air inlet 91 and an air outlet 92. The end of solenoid plunger 31A seats in chamber 90 acting as a valve. Air inlet 91 is connected to the vehicle air compressor. Air outlet 92 is connected to the carburetor governor diaphragm as shown diagrammatically in Figure 1. Plunger 31A is normally urged by spring 93 into chamber 90 closing the air valve. When the solenoid is energized by the action of any of the actuator devices of this invention due to a drop in engine vacuum caused by lugging, plunger 31A is retracted permitting air flow through valve 89 to cut off the fuel supply in the manner heretofore described, causing a momentary stall and forcing the operator to shift to a lower gear to increase the engine R. P. M. and restore normal engine vacuum.

It will be readily understood that this invention embraces the use of any of the actuator devices in combination with any of the stall-inducing devices. The use of air pressure to upset the equilibrium of the carburetor governor diaphragm is especially adapted for use with heavy duty vehicles, such as trucks, already equipped with air compressors. The use of means to alter the normal functioning of the ignition system is especially adapted for light weight trucks and automobiles. In any of these circumstances using any combination of actuator and stall-inducing element, upon drop in engine vacuum due to lugging of the engine the engine is put into a momentary stall which demands immediate correction by the operator by shifting into a lower gear to increase the engine R. P. M. and restore engine vacuum.

It is apparent that many modifications and variations of this invention as hereinbefore set forth may be made without departing from the spirit and scope thereof. The specific embodiments described are given by way of example only and the invention is limited only by the terms of the appended claims.

What I claim is:

1. A low R. P. M. control device for automotive engines which comprises a vacuum controlled actuator and a stall-inducing element, said actuator comprising two electrical contact points, one of said contacts being fixed and the other of said contacts being resiliently mounted, a vacuum chamber within said actuator for retracting said resiliently mounted contact from said first contact under the influence of engine vacuum, conductor means for completing a circuit through said contacts and through said stall-inducing element, one of said conductors being adapted to be grounded and another of said conductors being adapted for connection with the electrical energy source of said engine, a magnetic coil in said stall-inducing element, means operative upon energization of said coil to upset the equilibrium of said engine to momentarily stall said engine unless immediate remedial steps are taken.

2. A low R. P. M. control device according to claim 1 further characterized in that said resiliently mounted contact point is mounted on a closed end metal bellows in communication with said vacuum chamber for retraction.

3. A low R. P. M. control device according to claim 1 further characterized in that said stall-inducing element comprises an air valve and a solenoid coil, said valve being operative upon energization of said solenoid.

4. A low R. P. M. control device according to claim 3 further characterized in that said air valve comprises a valve chamber, two openings to said chamber, one of said openings being an air inlet, the other of said openings being an air outlet, a valving member seatable in one of said openings, said valving member being operative by said solenoid.

5. A low R. P. M. control device according to claim 4 further characterized in that a flexible diaphragm extends across said valve chamber, the valving member is on said diaphragm within the chamber, said diaphragm and valving member being operative by said solenoid.

6. A low R. P. M. control device for automotive engines which comprises a hollow tubular housing, a vacuum controlled actuator and a stall-inducing element within said housing, said actuator comprising two electrical contact points, one of said contacts being fixed and the other of said contacts being resiliently mounted, a vacuum chamber within said actuator for retracting said resiliently mounted contact from said first contact under the influence of engine vacuum, conductor means for completing a circuit through said contacts, one of said conductors being adapted to be grounded and another of said conductors being adapted for connection with the electrical energy source of said engine, an air valve and a solenoid coil in said stall-inducing element, said air valve comprising a valve chamber, two openings to said chamber, one of said openings being an air inlet and the other of said openings being an air outlet, and a valving member seatable in one of said openings, said valving member being operative by said solenoid.

7. A low R. P. M. control device according to claim 6 further characterized in that said resiliently mounted contact point is mounted on a closed end metal bellows in communication with said vacuum chamber for retraction.

8. A low R. P. M. control device according to claim 6 further characterized in that a flexible diaphragm extends across said valve chamber, the valving member is on said diaphragm within the chamber, said diaphragm and valving member being operative by said solenoid.

9. A low R. P. M. control device for automotive engines which comprises a vacuum controlled actuator and a stall inducing element, said actuator comprising two electrical contact points, one of said contacts being fixed and the other of said contacts being resiliently mounted, a vacuum chamber within said actuator for retracting said resiliently mounted contact from said first contact under the influence of engine vacuum, conductor means for completing a circuit through said stall-inducing element, one of said conductors being adapted to be grounded and another of said conductors being adapted for connection with the electrical energy source of said engine, a magnetic coil in said stall inducing element, a switch operative upon energization of said coil to upset the equilibrium of the electrical system of said engine to momentarily stall said engine unless immediate remedial steps are taken.

10. A low R. P. M. control device according to claim 9 further characterized in that said stall inducing element comprises a relay adapted to be installed in the electrical system of said engine between the voltage regulator and the ignition coil, said relay including a two-way switch and a resistor, said switch being adapted upon energization of the magnetic coil to direct current to the ignition coil through said resistor whereby the voltage is greatly diminished and the engine stalls momentarily.

References Cited in the file of this patent
UNITED STATES PATENTS

| | | |
|---|---|---|
| 2,134,889 | Phillips | Nov. 1, 1938 |
| 2,455,573 | Fant | Dec. 7, 1948 |
| 2,585,814 | McDonald | Feb. 12, 1952 |